E. A. C. SCHOOF.
LOCKABLE COCK FOR GAS METERS.
APPLICATION FILED MAY 4, 1914.
1,111,618.
Patented Sept. 22, 1914.
Fig. 1.
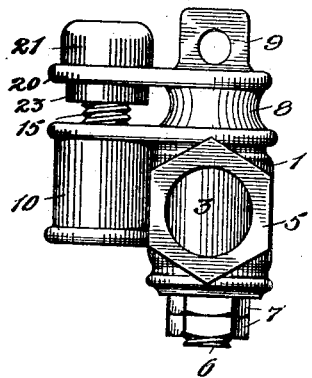
Fig. 2.
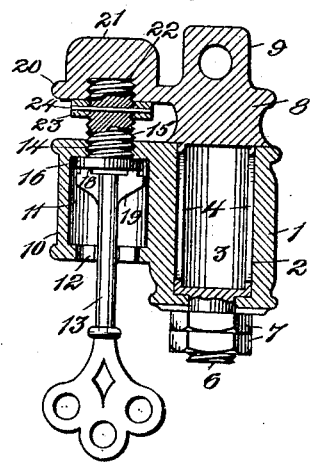
Fig. 3.
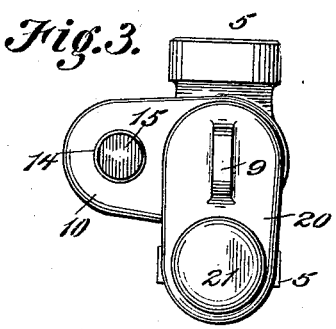
Fig. 4.
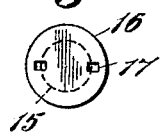
Fig. 5.
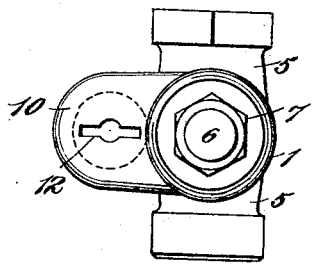
Fig. 6.
WITNESSES
G. R. Pierce
C. Bradway
INVENTOR
Ernst A. C. Schoof.
BY Munn & Co
ATTORNEYS

UNITED STATES PATENT OFFICE.

ERNST A. C. SCHOOF, OF NEW YORK, N. Y.

LOCKABLE COCK FOR GAS-METERS.

1,111,618.     Specification of Letters Patent.     Patented Sept. 22, 1914.

Application filed May 4, 1914. Serial No. 836,180.

*To all whom it may concern:*

Be it known that I, ERNST A. C. SCHOOF, a citizen of the United States, and a resident of the city of New York, borough of the Bronx, county of Bronx, and State of New York, have invented a new and Improved Lockable Cock for Gas-Meters, of which the following is a full, clear, and exact description.

This invention relates to lockable cocks adapted especially for use in connection with gas-meters, although it is not limited to this application.

The invention has for its general objects to improve and simplify the construction and operation of lockable cocks of the character referred to so as to be reliable and efficient in use, comparatively inexpensive to manufacture, practically tamper-proof and yet easily manipulated and controlled by authorized persons.

A more specific object of the invention is the provision of a locking means for a gas cock in which the valve or plug and casing of the cock are of standard design and the locking means is applied thereto in such a manner as not to impair the efficiency of the cock as to durability, cheapness and non-leakage.

With these objects in view, and others which will appear as the description proceeds, the invention comprises various novel features of construction and arrangement of parts which will be set forth with particularity in the following description and claims appended hereto.

In the accompanying drawing, which illustrates one embodiment of the invention, and wherein similar characters of reference indicate corresponding parts in all the views, Figure 1 is a side view of the lockable gas cock; Fig. 2 is a vertical section thereof, showing the lock-controlling key entered in the locking means; Fig. 3 is a plan view of the cock, showing the same when the valve is open for the flow of gas or other fluid; Fig. 4 is a bottom plan view of the locking element or screw; Fig. 5 is a bottom plan view of the cock when in locked position; and Fig. 6 is a perspective view of the key.

Referring to the drawing, 1 designates the casing of the cock, which has a finished bore 2 in which the plug or valve 3 rotatably and snugly fits, the valve having oppositely disposed ports 4 which are adapted to aline with the oppositely extending nipples 5 on the valve casing to which pipe connections are made. The lower end of the valve has a threaded stud 6 on which are nuts 7 for tightly seating the valve, and on the opposite end of the valve is a head 8 having a non-circular portion 9 to which a wrench or other operating means may be applied for opening and closing the cock by rotating the valve or plug 3. The parts of the cock thus far described are of standard construction and the locking means is added to the casing and valve respectively without changing the standard design of the same. The casing 1 has a lateral projection 10 which is provided with a chamber 11, and the bottom of this chamber is provided with an opening 12 of any desired configuration to receive the key 13. In the top of the chamber 11 is a threaded opening 14 in which engages a screw 15, the head 16 of which is disposed within the chamber 11 and has sockets or equivalent means 17 to receive the lugs 18 on the bit 19 of the key 13. The disposition and shapes of the sockets and lugs may be varied as desired to render tampering with the locking means impossible.

On the valve element of the cock there is formed integral with the head 8 an arm 20 which is formed with a socket 21 open at its under side and provided with a thread 22 with which the upper end of the screw 15 is adapted to engage. On the screw is an annular flange formed in any suitable manner, as, for instance, by a ring or collar 23 secured by a pin 24 which passes through the ring and screw. This is adapted to jam against the under side of the arm 20 as the screw or locking element is screwed home, as shown in Fig. 1. This screw locking element is operated by the key 13 and is used only when the cock is closed, to cut off the supply of gas or other fluid. Normally the arm is thrown around at right-angles from the position shown in Fig. 2 to that shown in Fig. 3, and the screw is retracted downwardly so as to clear the under side of the arm 20. When the cock is to be locked the valve element thereof is thrown around through ninety degrees to bring the socket 21 in alinement with the locking screw 15. The screw is then turned by means of the key 13 until the shoulder formed by the ring 23 jams against the under side of the arm 20. The key is then removed, and as the head of the screw is at the top of the chamber 11 it can not be readily reached by any device used in an effort to turn the screw to unlocking position, and besides the only instrument which can turn the screw is one which is shaped like the key 13, and of course the latter is kept by authorized persons.

From the foregoing description taken in connection with the accompanying drawing, the advantages of the construction and method of operation will be readily understood by those skilled in the art to which the invention appertains, and while I have described the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A cock of the class described comprising a casing, a valve element rotatably mounted therein and having a portion extending out of the casing, an arm on the said extending portion and having a threaded opening, a chamber formed on the side of the casing, a screw threaded in the chamber and adapted to extend out of the same and screw into the said arm, and means on the screw for engagement with a key, said screw being disposed on its axis parallel with the valve.

2. A cock of the class described comprising a casing, a valve therein, a laterally-extending arm on the valve and exposed outside the casing, said arm having a threaded opening, a chamber on the side of the casing and having an opening in alinement with the opening in the arm, a screw threaded in the chamber and extending out of the opening thereof and having its outer end arranged to screw into the opening of the arm, a collar on the screw and adapted to jam against the arm, and a head on the screw and arranged within the casing and having means for engagement with the key.

In testimony whereof I have signed my name to this specification in the presence of two subscribing witnesses.

ERNST A. C. SCHOOF.

Witnesses:
 THOMAS F. LOCHRANE,
 ARTHUR E. HICKOX.

---

Copies of this patent may be obtained for five cents each, by addressing the "Commissioner of Patents, Washington, D. C."